US009115982B2

(12) United States Patent
Jones et al.

(10) Patent No.: US 9,115,982 B2
(45) Date of Patent: *Aug. 25, 2015

(54) INTERCHANGEABLE CHROMATIC RANGE SENSOR PROBE FOR A COORDINATE MEASURING MACHINE

(71) Applicant: Mitutoyo Corporation, Kawasaki-shi, Kanagawa-ken (JP)

(72) Inventors: Benjamin Keith Jones, Seattle, WA (US); Scott Allen Harsila, Bothell, WA (US); Andrew Michael Patzwald, Kirkland, WA (US); David William Sesko, Woodinville, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/286,913

(22) Filed: May 23, 2014

(65) Prior Publication Data

US 2014/0340679 A1 Nov. 20, 2014

Related U.S. Application Data

(63) Continuation of application No. 13/481,734, filed on May 25, 2012, now Pat. No. 8,736,817.

(51) Int. Cl.
*G01B 11/00* (2006.01)
*G01B 21/04* (2006.01)
*G01J 3/28* (2006.01)

(52) U.S. Cl.
CPC ............ *G01B 11/005* (2013.01); *G01B 11/007* (2013.01); *G01B 21/047* (2013.01); *G01J 3/2803* (2013.01); *G01B 2210/50* (2013.01)

(58) Field of Classification Search
CPC ............... G01C 3/08; G01C 3/00; G01C 5/00
USPC .................................. 356/3.01–28.5
See application file for complete search history.

(56) References Cited

U.S. PATENT DOCUMENTS

| 4,651,405 A | 3/1987 | McMurtry |
| 4,688,307 A | 8/1987 | Schneider |

(Continued)

FOREIGN PATENT DOCUMENTS

| DE | 10 2007 054 915 A1 | 5/2009 |
| WO | 2009062641 A1 | 5/2009 |

OTHER PUBLICATIONS

"Accessories for STIL Point Sensors," STIL S.A., Aix en Provence, France, <http://www.stilsa.com/EN/prod/chr/accessories.htm. [retrieved Apr. 26, 2012], 1 page.

(Continued)

*Primary Examiner* — Luke Ratcliffe
(74) *Attorney, Agent, or Firm* — Christensen O'Connor Johnson Kindness PLLC

(57) ABSTRACT

An interchangeable chromatic range sensor (CRS) probe for a coordinate measuring machine (CMM). The CRS probe is capable of being automatically connected to a CMM under program control. In one embodiment, in order to make the CRS probe compatible with a standard CMM auto exchange joint, all CRS measurement light transmitting and receiving elements (e.g., the light source, wavelength detector, optical pen, etc.) are included in the CRS probe assembly. The CRS probe assembly also includes an auto exchange joint element that is attachable through a standard auto exchange joint connection to a CMM. In one embodiment, in order to provide the required signals through the limited number of connections of the standard CMM auto exchange joint (e.g., 13 pins), a low voltage differential signaling (LVDS) serializer may be utilized for providing additional control and data signals on two signal lines.

20 Claims, 11 Drawing Sheets

(56) References Cited

U.S. PATENT DOCUMENTS

| | | |
|---|---|---|
| 4,908,951 A | 3/1990 | Gurny |
| 4,979,284 A | 12/1990 | McMurtry |
| 5,118,956 A | 6/1992 | Dunning |
| 5,323,540 A | 6/1994 | McMurtry |
| 5,339,535 A | 8/1994 | McMurtry |
| 5,505,005 A | 4/1996 | McMurtry |
| 5,526,576 A | 6/1996 | Fuchs |
| 5,657,549 A | 8/1997 | Shen |
| 5,705,814 A | 1/1998 | Young |
| 5,825,666 A | 10/1998 | Freifeld |
| 6,093,930 A | 7/2000 | Boyette, Jr. |
| 6,275,053 B1 | 8/2001 | Morrison |
| 6,546,643 B2 | 4/2003 | Lotze |
| 6,633,051 B1 | 10/2003 | Holloway |
| 6,940,610 B2 | 9/2005 | Prinzhausen |
| 6,945,100 B2 | 9/2005 | Kwon |
| 7,096,077 B2 | 8/2006 | Price |
| 7,369,225 B2 | 5/2008 | Messerschmidt |
| 7,486,394 B2 | 2/2009 | Lehmann |
| 7,626,705 B2 | 12/2009 | Altendorf |
| 7,652,275 B2 | 1/2010 | Gladnick |
| 7,722,515 B2 | 5/2010 | McMurty |
| 7,876,456 B2 | 1/2011 | Sesko |
| 7,891,248 B2 | 2/2011 | Hough |
| 7,908,757 B2 | 3/2011 | Ferrari |
| 7,990,522 B2 | 8/2011 | Sesko |
| 8,099,793 B2 | 1/2012 | Jo |
| 8,194,251 B2 | 6/2012 | Emtman |
| 8,212,997 B1 | 7/2012 | Xie |
| 2002/0146276 A1 | 10/2002 | Le Guin |
| 2003/0015653 A1 | 1/2003 | Hansma |
| 2004/0165191 A1 | 8/2004 | Breider |
| 2008/0024793 A1 | 1/2008 | Gladnick |
| 2008/0052936 A1 | 3/2008 | Briggs |
| 2009/0082986 A1 | 3/2009 | Pettersson |
| 2009/0165317 A1 | 7/2009 | Little |
| 2010/0312524 A1 | 12/2010 | Siercks |
| 2011/0037987 A1 | 2/2011 | Gurny |
| 2011/0080588 A1 | 4/2011 | Segall |
| 2011/0229091 A1 | 9/2011 | Jensen |
| 2011/0258868 A1 | 10/2011 | Jordil |
| 2012/0050723 A1 | 3/2012 | Emtman |
| 2012/0110866 A2 | 5/2012 | Jensen |
| 2013/0097882 A1 | 4/2013 | Bridges |
| 2013/0163006 A1 | 6/2013 | Sesko |
| 2013/0222815 A1* | 8/2013 | Patzwald .................. 356/612 |
| 2013/0314689 A1 | 11/2013 | Jones |
| 2013/0314690 A1 | 11/2013 | Jones |

OTHER PUBLICATIONS

"Confocal Chromatic Displacement Sensors," Micro-Epsilon Messtechnik GmbH & Co. KG, Ortenburg, Germany, [n.d.], 12-page brochure.

Extended European Search Report dated Aug. 21, 2013, issued in corresponding Application EP 13 16 9331.9, filed May 27, 2013, 6 pages.

Extended European Search Report dated Aug. 26, 2013, issued in corresponding Application EP 13 16 9336.8, filed May 27, 2013, 6 pages.

"Non-Contact 3D Measurement Systems," STIL E-Catalog, E1010, STIL S.A., Aix en Provence, France, [n.d.], pp. 44-49.

"Non-Contact <<Point>> Sensors," STIL E-Catalog, E1104, STIL S.A., Aix en Provence, France, [n.d.], pp. 4-27.

* cited by examiner

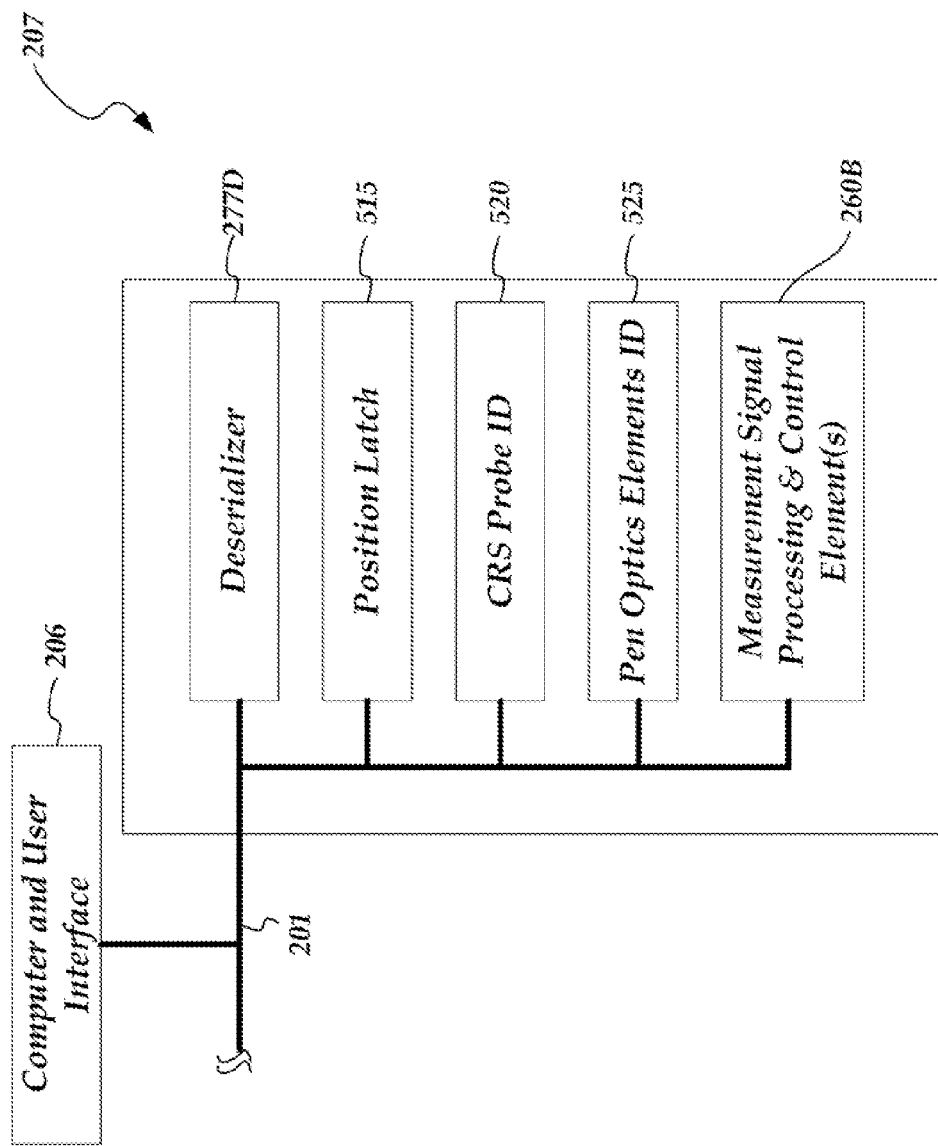

| Position | Description |
|---|---|
| D0 | Detector pixel clock |
| D1 | Profile start signal |
| D2 | Spectrometer ready signal |
| D3 | XYZ Latch signal |
| D4 | Detector temperature alarm |
| D5 | Spectrometer temperature alarm |
| D6 | Unused |
| D7 | Unused |
| D8 | Unused |
| D9 | Unused |

| Wire # | Signal Direction | CRS Signal Description |
|---|---|---|
| one of wires 2-14 | → | +12V, 300 mA |
| one of wires 2-14 | → | +12V, 300 mA |
| one of wires 2-14 | - | GND |
| one of wires 2-14 | ↓ | SERDES+ |
| one of wires 2-14 | ↓ | SERDES- |
| one of wires 2-14 | - | GND |
| one of wires 2-14 | ↑ | SERDES Lock/Sync |
| one of wires 2-14 | ↑ | Spectrometer Reset |
| one of wires 2-14 | ↑ | I²C Clock |
| one of wires 2-14 | ↕ | I²C Data |
| one of wires 2-14 | - | Other |
| one of wires 2-14 | - | Other |
| one of wires 2-14 | - | Other |
| Inner Shield | - | GND |
| Outer Shield | - | GND |
| Coax/1 | ← | Detector profile signal(s) |

*Fig. 7.*

INTERCHANGEABLE CHROMATIC RANGE SENSOR PROBE FOR A COORDINATE MEASURING MACHINE

CROSS-REFERENCE TO RELATED APPLICATION

This application is a continuation of U.S. Ser. No. 13/481,734, filed May 25, 2012, the disclosure of which is incorporated by reference herein in its entirety.

FIELD

The invention relates generally to precision measurement instruments, and more particularly to probes for coordinate measuring machines.

BACKGROUND

In one type of coordinate measuring machine, the surface of a workpiece is scanned with a probe. After the scan, a three dimensional profile of the workpiece is provided. In one type of scanning probe, the workpiece is directly measured by touching a mechanical contact of the probe to various points along the workpiece surface. In some cases, the mechanical contact is a ball.

In other coordinate measuring machines, an optical probe is utilized which measures the workpiece without making physical contact with the surface. Certain optical probes (e.g., triangulation probes) utilize light to measure workpiece surface points, and some optical probes comprise video cameras which are used to image 2-D sections of the workpiece surface (e.g., stereo vision systems, or structured light systems). In some systems, the coordinates of the geometric elements of the workpiece are determined via image processing software.

Certain "combined" coordinate measuring machines that use both optical and mechanical measuring sensors are also known. One such device is described in U.S. Pat. No. 4,908,951, which is hereby incorporated by reference in its entirety. The described apparatus has two spindles, one that carries the mechanical probe, and one that holds a video camera having a beam path into which a laser probe is simultaneously reflected for making measurements in the Z-coordinate, that is, along the optical axis of the video camera.

U.S. Pat. No. 5,825,666, which is hereby incorporated by reference in its entirety, describes an optical coordinate measuring machine wherein an optical touch probe of the device has a first target on the distal end thereof, on the contact element of a standard probe. The standard probe is mounted to a video camera to image the target on the camera. Movement and position of the target along the X and Y coordinates is indicated by the machine's computer image processing system. A second target is mounted to the proximal end of the probe and indicates movement and position in the Z coordinate. The second target may obscure a photo detector, but preferably is parfocused on the camera by a light beam parallel to the X, Y plane. Preferably there are two second targets illuminated by orthogonal beams parallel to the X, Y plane. Rotation around the Z axis then may be calculated by the computer when star probes are used. Auto changing racks are also disclosed for holding multiple probes, a probe holder, and lenses for selective mounting on the camera.

Measuring probes are frequently interchangeably attached to coordinate measuring machines at an auto exchange joint connection included in various "probe heads." At present, Renishaw™ probe heads are the most commonly used for certain applications in the industry. These probe heads are manufactured by Renishaw Metrology Limited in Gloucestershire, United Kingdom. While Renishaw type probe head systems are the most commonly used in the industry, certain technologies are not easily incorporated into Renishaw type systems. Furthermore, attempts to upgrade an existing Renishaw type probe head system to one with more advanced capabilities can entail significant costs and/or inconvenience. For example, certain technologies adapted to a Renishaw type probe head system may lack desirable features, lack a desirable level of controllability, and/or lack the capacity for being automatically interchangeable with other types of probes that may be interfaced to the Renishaw type probe head system. One particular issue with regard to using Renishaw type probe head systems, or similar systems, is that the existing data and control connections between the machines and the probes consist of a limited number of wired connections and no optical fiber connections or optical paths at the auto exchange joint. This effectively forms a "bottleneck" which makes it difficult to add additional technologies and/or features to a probe that is to be mounted and/or exchanged using the probe head system. In particular, existing chromatic range sensors have not been automatically attachable and/or interchangeable using a Renishaw type probe head system, or the like.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An interchangeable chromatic range sensor (CRS) probe for a coordinate measuring machine (CMM) is provided. In accordance with one aspect, the CRS probe is capable of being automatically connected to a CMM under program control. In one embodiment, in order to make the CRS probe compatible with a standard CMM auto exchange joint (e.g., one including a limited number of conductive connections and no optical fiber connections), all CRS measurement light transmitting and receiving elements (e.g., the light source, wavelength detector, optical pen, etc.) are included in the CRS probe assembly.

In accordance with another aspect, the CRS probe system includes an auto exchange joint element and a CRS probe assembly. The auto exchange joint element is attachable through a standard auto exchange joint connection to a CMM. The CRS probe assembly is mounted to the auto exchange joint element, for automatic connection to the CMM through the auto exchange joint element.

In accordance with another aspect, the CRS probe assembly includes an optical pen, an electrically powered light source, and a CRS wavelength detector. The optical pen comprises a confocal optical path including a chromatically dispersive optics portion and is configured to focus different wavelengths at different distances along a measurement axis proximate to a workpiece surface to be measured. The electrically powered light source receives electrical power transmitted through the auto exchange joint element and generates light originating in the CRS probe assembly, and the light comprises an input spectral profile of wavelengths routed to the optical pen. The CRS wavelength detector comprises a plurality of pixels (that is, photodetector elements that are closely spaced) distributed with close spacing along a measurement axis of the CRS wavelength detector, and the plurality of pixels receive respective wavelengths reflected into the confocal optical path from the target surface and provide output spectral profile data.

In accordance with another aspect, the CRS probe assembly is configured to receive power and control signals through the auto exchange joint connection. The CRS probe assembly is configured such that when the auto exchange joint element is attached to a CMM and the optical pen is operably positioned relative to a workpiece surface to perform measurement operations and the electrically powered light source generates the light, the optical pen inputs the input spectral profile and outputs corresponding radiation to the workpiece surface through the confocal optical path and receives reflected radiation from the workpiece surface through the confocal optical path and outputs the reflected radiation to provide an output spectral profile to the CRS wavelength detector. The output spectral profile comprises a distance-dependent profile component having a wavelength peak that indicates a measurement distance from the optical pen to the workpiece surface, and the CRS wavelength detector provides corresponding output spectral profile data. The CRS probe assembly is configured to output measurement signals based on the output spectral profile data, and the output measurement signals are indicative of a measurement distance to the workpiece surface. In various embodiments, the output measurement signals are carried on at least one conductor through the auto exchange joint element. In some embodiments, some or all of the signals may be wirelessly transmitted, and bypass the probe's auto exchange joint connection. It will be appreciated that the feature of the CRS probe configurations disclosed herein that allows them to be self-contained and automatically exchangeable is that they are configured to generate and process the light used for measurement entirely within the CRS probe assembly.

In accordance with another aspect, the output measurement signals comprise the output spectral profile data from the plurality of pixels of the CRS wavelength detector. In one implementation, the output measurement signals may be transmitted through a shielded coaxial cable included in the auto exchange joint, and may be received through the auto exchange joint element by a probe signal processing and control circuit which determines measurement distances based on the output spectral profile data.

In accordance with another aspect, the CRS probe assembly further comprises an identification component which provides identification data for the CRS probe assembly that is output through the auto exchange joint element to at least one of the CMM and a probe signal processing and control circuit. In one implementation, the CRS probe assembly further comprises a memory portion which includes at least one of calibration data or compensation data for the CRS probe assembly. In another implementation, at least one of calibration data or compensation data for the CRS probe assembly is stored externally to the CRS probe assembly, e.g., in at least one of the CMM and a probe signal processing and control circuit that receives signals from the CRS probe assembly through the auto exchange joint element.

In accordance with another aspect, the center of mass of the optical pen is located proximate to an axis defined by the center of mass of the CRS probe assembly and the center of the auto exchange joint. In one implementation, the optical pen is mounted relative to the auto exchange joint such that the central axis of the optical pen is coaxial with the central axis of the auto exchange joint, such that when the CMM rotates the auto exchange joint around its axis the optical pen is also rotated around its central axis with no substantial lateral movement of the optical pen's central axis due to the rotation. The central axis may be regarded as a reference axis for measurement distances determined by the CRS probe, when the measurement beam of the probe is directed transverse to the central axis.

In accordance with another aspect, the optical pen comprises an interchangeable optics element which includes the chromatically dispersive optics portion, and the optical pen further comprises an optical pen base member that receives the interchangeable optics element and holds it in a fixed relationship relative to the base member. In one implementation, the optical pen base member comprises a housing including a first mating half of a repeatable fast exchange mount, and the end of an optical fiber that is connected to the light source and the wavelength detector, wherein the optical fiber is terminated proximate to a confocal aperture that is fixed relative to the first mating half of the repeatable fast exchange mount. The first mating half of the repeatable fast exchange mount may generally surround the confocal aperture. The interchangeable optics elements may comprise a second mating half of the repeatable fast exchange mount, and an optical assembly that is fixed relative to the second mating half of the repeatable fast exchange mount comprising the chromatically dispersive optics portion. The optical assembly receives measurement light from, and returns measurement light to, the confocal aperture, and provides axial chromatic dispersion of the measurement light over a respective measuring range along a measuring axis. The second mating half of the repeatable fast exchange mount may also be configured to be automatically connected to and separated from the first mating half of the repeatable fast exchange mount under program control. The second mating half of the repeatable fast exchange mount may be magnetically forced against the first mating half of the repeatable fast exchange mount by permanent magnets mounted in one or both of the first and second mating halves of the repeatable fast exchange mount.

In accordance with another aspect, the CRS probe assembly is configured such that the optical pen is mounted at a distal end of the CRS probe assembly. In one implementation, the CRS probe assembly includes a base portion mounted to the auto exchange joint element, a wavelength detector mounting portion coupled to the base portion, and an optical pen mounting portion coupled to the base portion and carrying the optical pen without carrying the wavelength detector. In some embodiments, the optical pen mounting portion comprises a hollow structural tube that extends away from the base portion and toward the distal end of the CRS probe assembly.

In accordance with another aspect, the number of connections on the autojoint for the CRS probe are made to be consistent with existing systems. For example, existing Renishaw type systems typically have standard connections with a standard number of pins (e.g. 13 pins). By providing an autojoint with standardized connections, existing systems can utilize the CRS probe more easily.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 5 is a block diagram illustrating the components of the probe controller of FIG. 2;

FIG. 7 is a table outlining one exemplary connection and/or signal scheme usable with the connection pins of an autojoint connection and the cable of FIG. 6;

DETAILED DESCRIPTION

Figure 1:
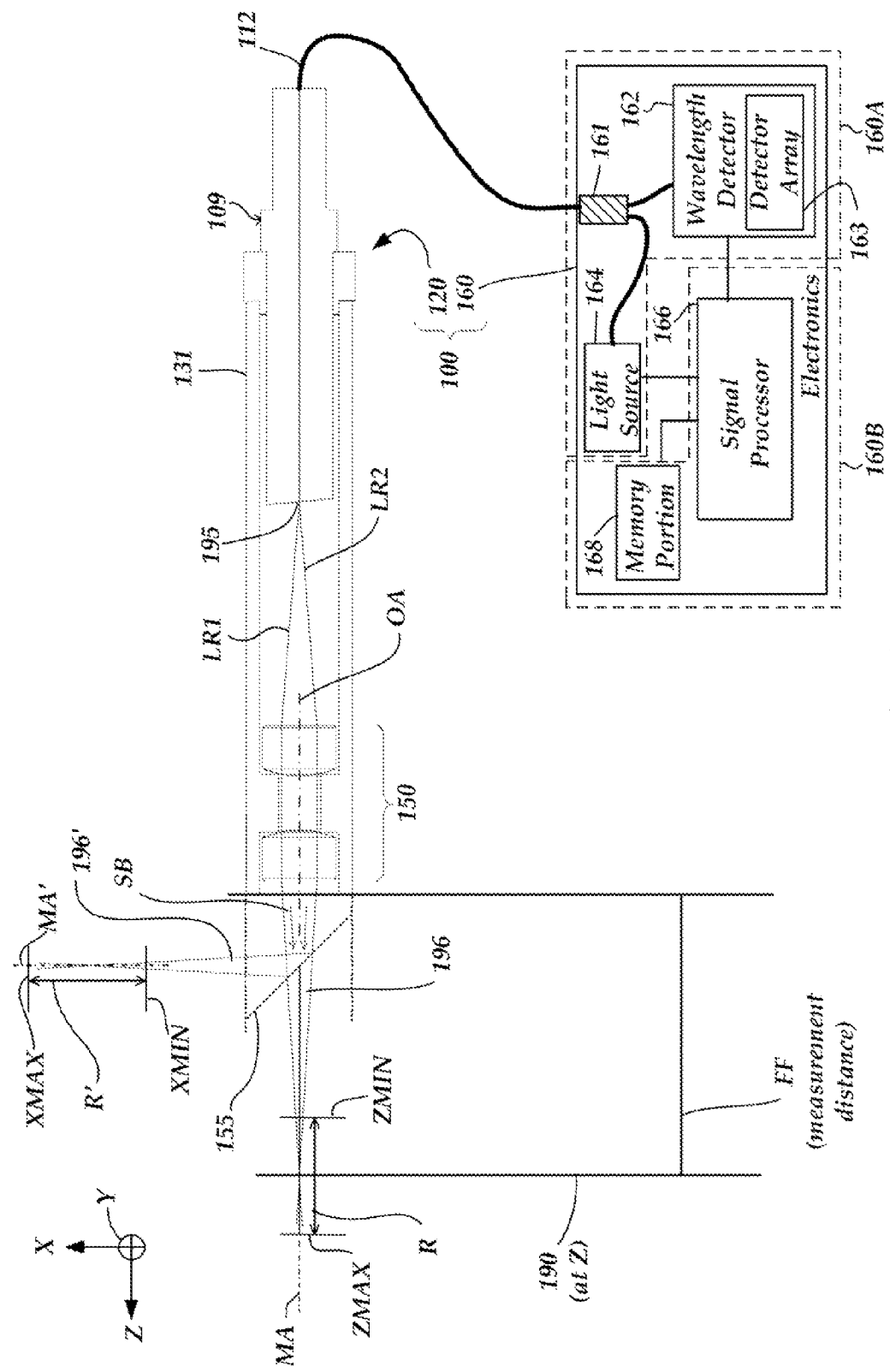
FIG. 1 is a block diagram of an exemplary CRS system including an optical pen.

FIG. 1 is a block diagram of an exemplary chromatic range sensor (CRS) system 100 of a first type based on operating principles that are desirable to employ in conjunction with a coordinate measuring machine. The CRS system 100 has certain similarities to sensors described in U.S. Pat. Nos. 7,876,456 and 7,990,522 (the '456 and '522 patents, respectively), which are hereby incorporated herein by reference in their entireties. As shown in FIG. 1, the CRS system 100 includes an optical element 120 and an electronics portion 160. It will be appreciated that the CRS system 100 shown in FIG. 1 is a chromatic point sensor system which measures a single measurement point at a time. The optical element 120 shown in FIG. 1 is an optical pen. However, in various embodiments, alternative types of chromatic range systems, such as a chromatic line sensor, may be configured to operate according to the systems and methods disclosed herein.

The optical pen 120 includes a fiber optic connector 109, a housing 131 (e.g., an assembly tube), and an optics portion 150. The fiber optic connector 109 is attached to the end of the housing 131. The fiber optic connector 109 receives an in/out optical fiber (not shown in detail) through a fiber optic cable 112 which encases it. The in/out optical fiber outputs source light through a fiber aperture 195, and receives reflected measurement signal light through the fiber aperture 195.

In operation, broadband (e.g., white) source light emitted from the fiber end through the fiber aperture 195 is focused by the optics portion 150, which includes a lens or lenses that provide an axial chromatic dispersion, such that the focal point along the optical axis OA is at different distances depending on the wavelength of the light, as is known for chromatic confocal sensor systems. The source light forms a measurement beam 196 that includes a wavelength that is focused on a workpiece surface 190 at a position Z relative to the optical pen 120. Upon reflection from the workpiece surface 190, reflected light is refocused by the optics portion 150 onto the fiber aperture 195. The operative source light and reflected light are bounded by the limiting rays LR1 and LR2. Due to the axial chromatic dispersion, only one wavelength will have a front focus dimension FF that matches the measurement distance from the optical pen 120 to the surface 190. The optical pen is configured such that the wavelength that is best focused at the surface 190 will also be the wavelength of the reflected light that is best focused at the fiber aperture 195. The fiber aperture 195 spatially filters the reflected light such that predominantly the best focused wavelength passes through the fiber aperture 195 and into the core of the optical fiber cable 112. As described in more detail below and in the incorporated references, the optical fiber cable 112 routes the reflected signal light to a wavelength detector 162 that is utilized for determining the wavelength having the dominant intensity, which corresponds to the measurement distance to the workpiece surface 190.

FIG. 1 also schematically illustrates an optional reflective element 155 in dashed outline. As described in more detail in U.S. Patent Publication No. 20120050723, which is hereby incorporated by reference in its entirety, a reflective element may be placed in the path of the source beam SB. In such an implementation, rather than the measurement axis MA being coaxial with the optical axis OA, the reflective element may direct the measurement beam 196' along a measurement axis MA' in a different direction (e.g., orthogonal to the optical axis), as needed in some measurement applications. Such an orthogonal orientation is utilized in the embodiments illustrated in FIGS. 2 and 4A, as will be described in more detail below.

The electronics portion 160 includes a fiber coupler 161, a wavelength detector 162, a light source 164, a signal processor 166 and a memory portion 168. In various embodiments, the wavelength detector 162 includes a spectrometer or spectrograph arrangement wherein a dispersive optics portion (e.g., a grating) receives the reflected light through the optical fiber cable 112 and transmits the resulting spectral intensity profile to a detector array 163. The wavelength detector 162 may also include related signal processing (e.g., provided by the signal processor 166, in some embodiments) that removes or compensates certain detector-related error components from the profile data. Thus, certain aspects of the wavelength detector 162 and the signal processor 166 may be merged and/or indistinguishable in some embodiments.

The white light source 164, which is controlled by the signal processor 166, is coupled through the optical coupler 161 (e.g., a 2×1 optical coupler) to the fiber cable 112. As described above, the light travels through the optical pen 120, which produces longitudinal chromatic aberration so that its focal length changes with the wavelength of the light. The wavelength of light that is most efficiently transmitted back through the fiber is the wavelength that is in focus on the surface 190 at the position Z. The reflected wavelength-dependent light intensity then passes through the fiber coupler 161 again so that approximately 50% of the light is directed to the wavelength detector 162, which may receive a spectral intensity profile distributed over an array of pixels along a measurement axis of the detector array 163, and operate to provide corresponding profile data as described in more detail in the incorporated references. Briefly, a subpixel-resolution distance indicating coordinate of the profile data (e.g., a peak position coordinate) is calculated by the signal processor 166, and the distance indicating coordinate corresponding to the wavelength peak determines the measurement distance to the surface via a distance calibration lookup table which is stored in the memory portion 168. The distance indicating coordinate may be determined by various methods such as determining the centroid of profile data included in a peak region of the profile data.

The optical pen 120 generally has a measurement range R that is bound by a minimum range distance ZMIN and a maximum range distance ZMAX. The measurement range R in some example instances of known optical pens may be approximately $1/10^{th}$ of the nominal standoff or working distance from the end of the pen (e.g., in the range of tens of microns to a few millimeters). FIG. 1 schematically illustrates that if the reflector element 155 is used, the measurement range R' may be directed along a measurement axis MA' determined by the placement of the reflector element 155 (e.g. the x-axis). In such a case, the measurement range R' may be bound by a minimum range distance XMIN and a maximum range distance XMAX.

It should be appreciated that the electronics portion 160 has conventionally been located away from the optical pen 120. It has been known to mount an optical pen analogous to the optical pen 120 shown in FIG. 1 on a CMM using a customized bracket, and to route an optical fiber analogous to the optical fiber cable 112 along a makeshift path on the outside of CMM components to a remotely located electronics portion analogous to the electronics portion 160. This inadequate and inconvenient method has persisted for a number of years, as a desirable combination of features has not been provided that allows an automatically interchangeable CRS probe system. The use of CRS systems with CMMs has thus been limited.

As disclosed in more detail below with respect to FIGS. 2, 3A, and 3B, in order to provide a desirable combination of features that provide a technically and economically attractive automatically interchangeable CRS probe system, certain components of the electronics portion 160 are desirable to include within a CRS probe assembly that is mated to a CMM through an auto joint connector. For example, in one implementation, a group of components in a light source and wavelength detector portion 160A (e.g., including the wavelength detector 162 and light source 164) may be included inside a CRS probe assembly. A group of components in a measurement signal processing and control circuit 160B (e.g., including the signal processor 166 and memory portion 168) may be located remotely outside of the CRS probe assembly, if desired (e.g., to maintain low probe weight and compact probe size).

Figure 2:
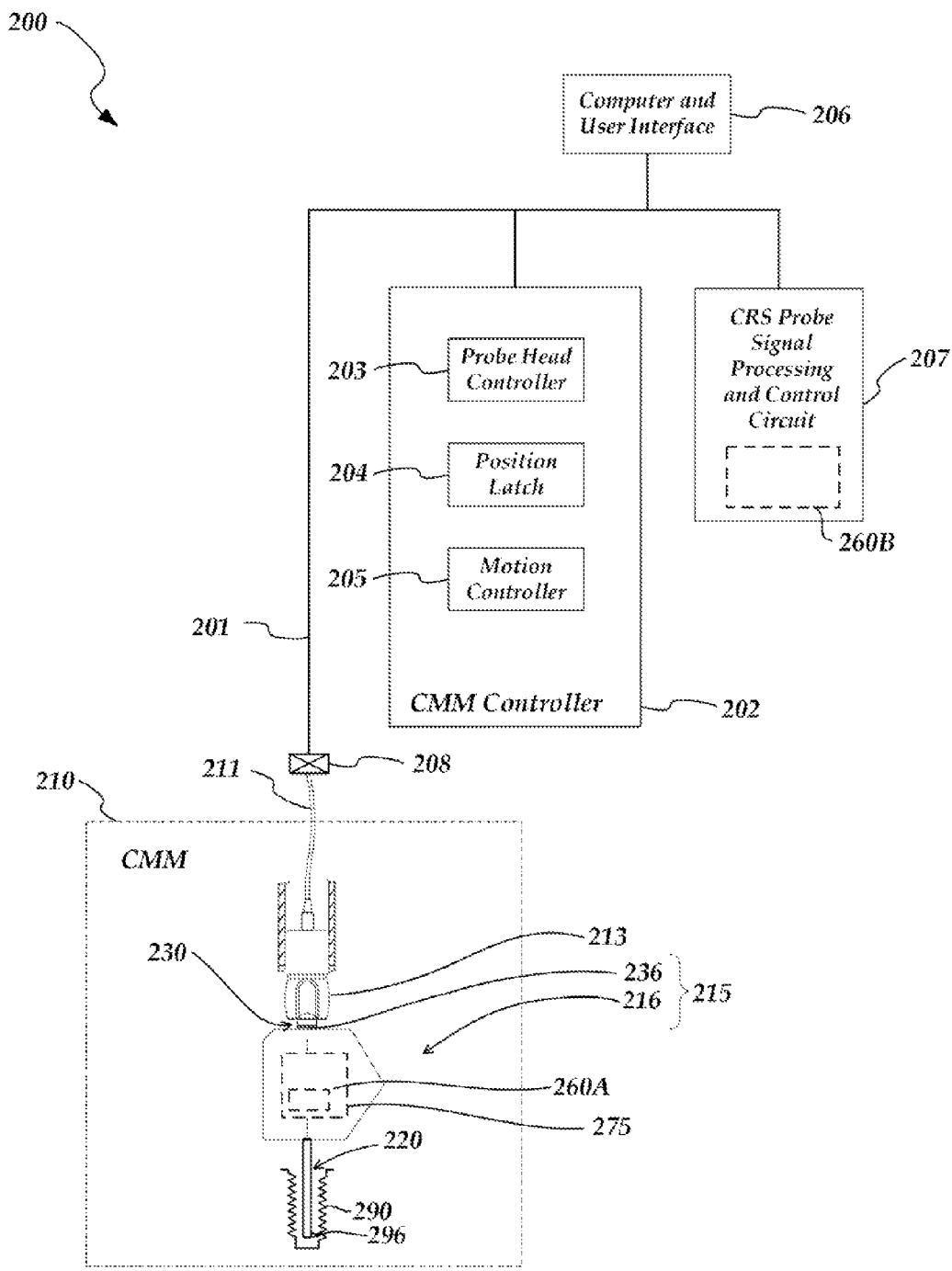
FIG. 2 is a block diagram of a coordinate measurement system including a coordinate measurement machine, a CRS probe including an optical pen, controllers, and a user interface.

FIG. 2 is a diagram of a coordinate measurement system 200, and an automatically connectable and interchangeable CRS probe system 215. That is, the CRS probe system 215 may be automatically interchanged with other types of CMM probes. A CRS probe system may also be referred to simply as a CRS probe herein. In various drawings herein, unless otherwise indicated by description or context, reference numbers having similar suffixes (e.g., reference number 1XX and 2XX having the suffix XX) may refer to generally analogous elements, such that operation of element 2XX may be generally understood by one of ordinary skill in the art with limited description, based on analogy to a previous description of analogous element 1XX, and so on. However, it will be understood that despite such analogy, various elements may have different implementations in different embodiments, as will be apparent to one of ordinary skill in the art, and are not limited to being identical.

The coordinate measurement system 200 includes a coordinate measurement machine controller 202, a computer and user interface 206, a probe signal processing and control circuit 207, and a coordinate measurement machine 210. The controller 202 includes a probe head controller 203, a position latch 204, and a motion controller 205. The CRS probe 215 includes an auto exchange joint element 236, and is connected to the coordinate measurement machine 210 through a mating joint element in the probe autojoint connection 230 (also referred to as an auto exchange joint connection).

The coordinate measurement machine 210 communicates with all of the other components through a data transfer line 201 (e.g., a bus), which is connected by a connector 208 (e.g., a "micro-D" type connector) to a probe head cable 211 which provides signals to and from the CRS probe 215. The coordinate measurement machine 210 is controlled by the coordinate measurement machine controller 202, while the CRS probe 215 exchanges data with, and is controlled by, the probe signal processing and control circuit 207 (e.g., in one embodiment, a probe signal processing and control circuit including measurement signal processing and control elements 260B, as outlined above with reference to the element 160B in FIG. 1). The user may control all of the components through the computer and user interface 206.

As outlined above, and described in more detail below with respect to FIGS. 3A and 3B, the CRS probe 215 includes probe electronics 275 which includes a light source and wavelength detector portion 260A (e.g., in one embodiment, a light source and wavelength detector as outlined above with reference to the element 160A, in FIG. 1), and an optical pen 220, which directs a measurement beam 296 toward a measurement surface 290. In one specific example implementation, the measurement surface 290 may comprise an internal surface of a threaded hole. Such surfaces have been difficult or impossible to measure completely and reliably with known CMM probes (e.g., a touch probe). A CRS probe such as that disclosed herein is able to scan and measure such surfaces with improved completeness, accuracy, and versatility.

As will be described in more detail below with respect to FIG. 5, in one embodiment, data related to the optical pen and/or interchangeable optics element (e.g., identification data, calibration data, compensation data, etc.) may be stored externally to the CRS probe 215 (e.g., in the probe signal processing and control circuit 207). In alternative implementations, portions of such data may be stored or otherwise encoded within portions of the CRS probe 215.

Figure 3A:
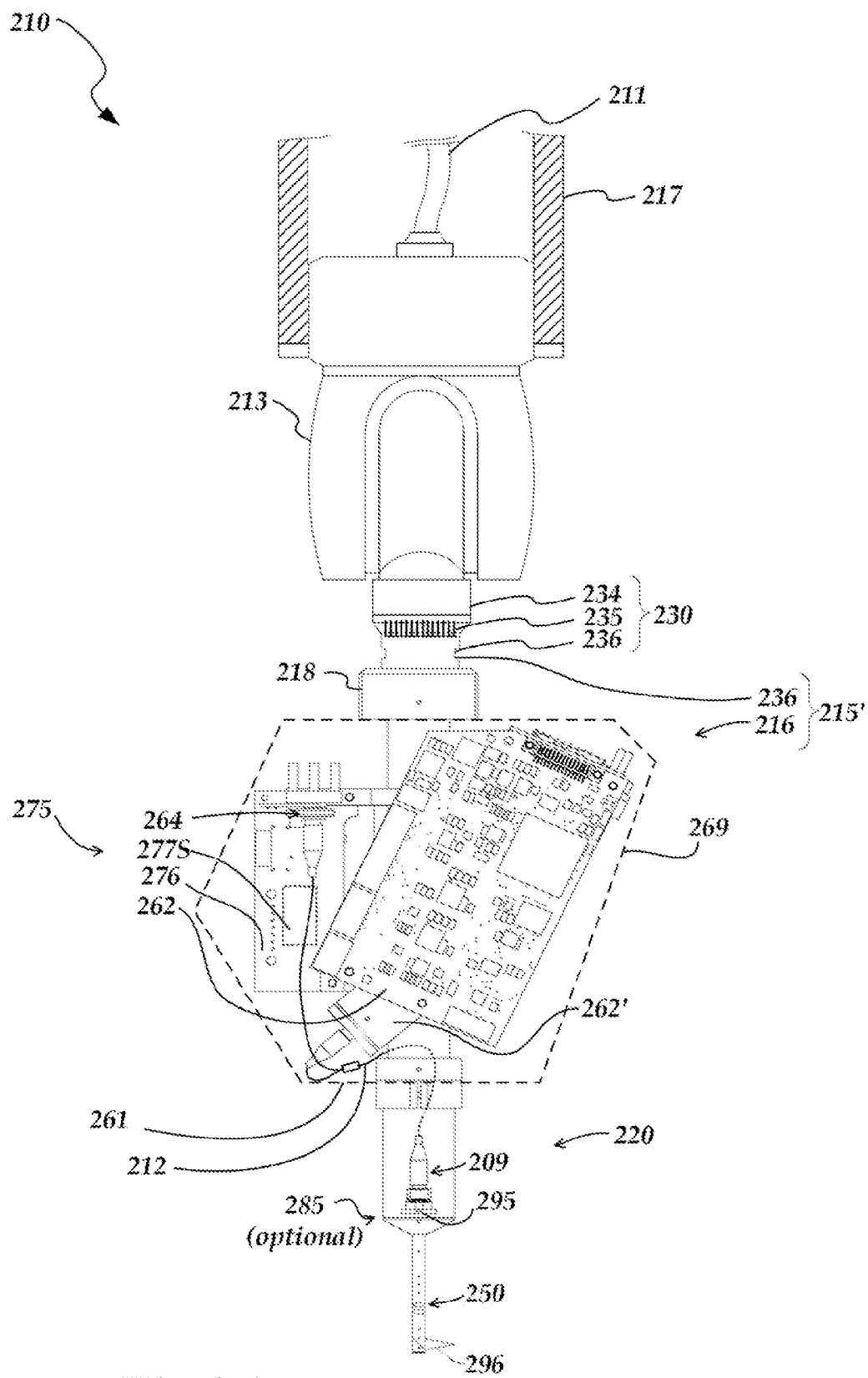
FIGS. 3A and 3B are diagrams illustrating the internal components of a first exemplary embodiment of the CRS probe of FIG. 2.
Figure 3B:
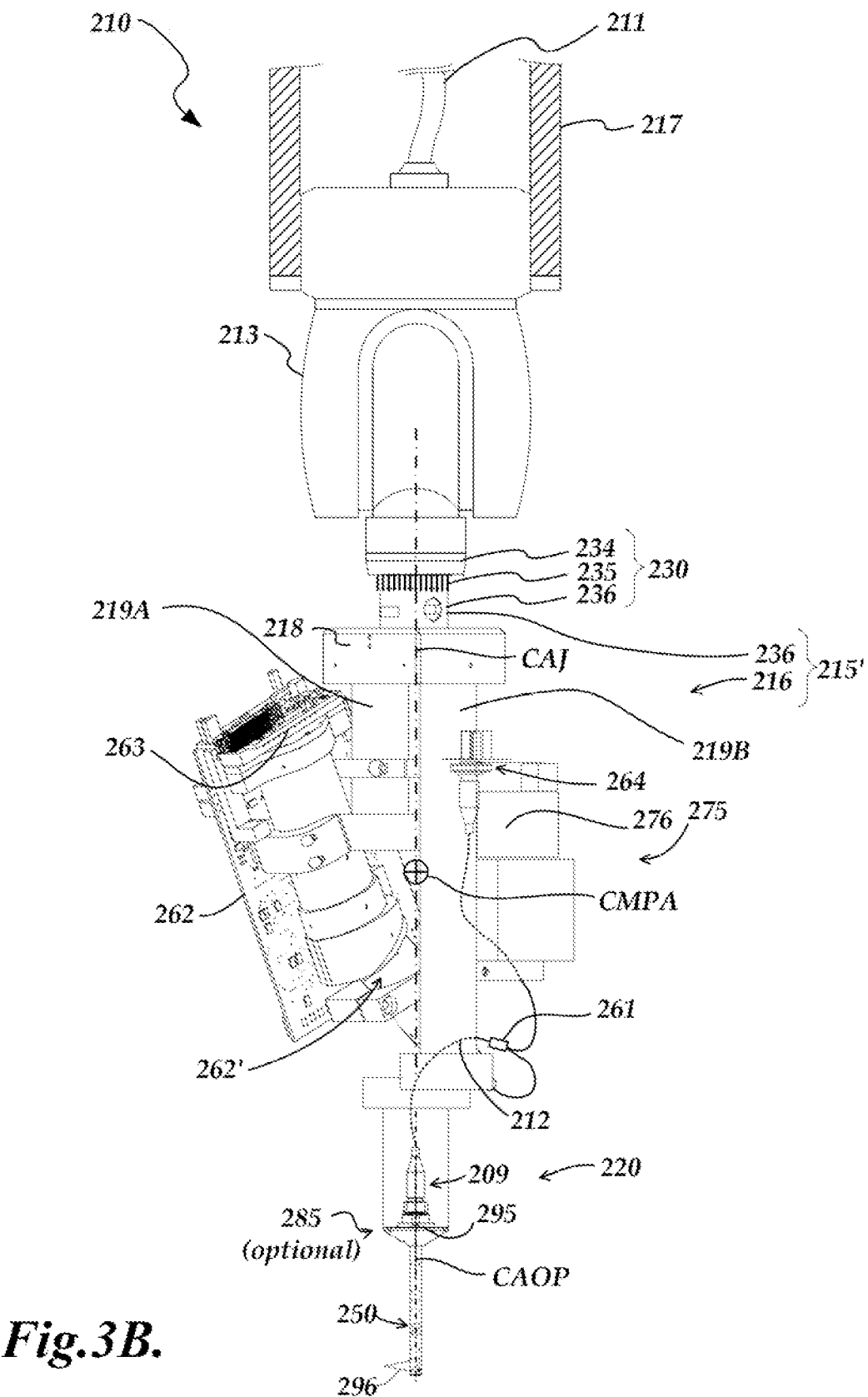

FIGS. 3A and 3B are diagrams schematically illustrating certain components of the coordinate measurement machine 210 and a CRS probe 215', which is similar to the CRS probe 215 of FIG. 2. FIG. 3A is a front view, and FIG. 3B is a view from a different angle of the coordinate measurement machine 210 and the CRS probe 215'. As shown in FIGS. 3A and 3B, the coordinate measuring machine 210 includes a probe head 213. The probe head 213 receives and transmits probe signals through the probe head cable 211. The probe head 213 is secured to a coordinate measurement machine quill 217. The probe head 213 is connected to the probe 215' at a probe autojoint connection 230, which will be described in more detail below with respect to FIG. 6.

The probe head 213 in some embodiments rotates in 360 degrees in a horizontal plane and contains a type of U-joint. The probe autojoint connection 230 is an electro-mechanical connection that fastens the probe head 213 rigidly and mechanically to the CRS probe 215', in a way such that it can be disconnected from one probe and attached to another. In one embodiment, the probe autojoint connection 230 may include first and second mating auto exchange joint elements 234 and 236, wherein the first auto exchange joint element 234 is mounted to the probe head 213, and the second mating auto exchange joint element 236 is mounted to the CRS probe 215'. In one embodiment, the probe autojoint connection 230 has mating electrical contacts or connections 235 so that when a probe is attached, the contacts automatically engage and make electrical connections. In some embodiments, this connection method can cause the system to have a relatively high amount of signal noise, which as will be described in more detail below makes it advantageous to use certain configurations and methods which can function effectively in a relatively noisy environment.

The CRS probe 215' receives its power and control signals through the autojoint connection 230. The signals passed to the CRS probe 215' through the autojoint connection 230 are passed through connections 235, as will be described in more detail below with respect to FIG. 6. As shown in FIGS. 3A and 3B, the CRS probe 215' includes an auto exchange joint element 236 and a probe assembly 216 that is mounted to the auto exchange joint element 236, for automatic connection to the CMM through the probe autojoint connection 230. The probe 215' may also include a protective cover or housing 269 (schematically illustrated). The probe assembly 216 comprises an optical pen 220, and probe electronics 275 which may comprise an electrically powered light source 264 and a wavelength detector 262, all supported by various structural members.

In the embodiment shown in FIGS. 3A and 3B, the structural members extend from a base 218 that is attached to the auto exchange joint element 236. The optical pen 220 (analogous to the optical pen 120) may include a fiber optic connector 209, and a confocal optical path including an aperture 295 and a chromatically dispersive optics portion 250, which outputs a measurement beam 296. In some embodiments, the optical pen 220 may include a repeatable fast exchange mount 285 which allows replacement of the chromatically dispersive optics portion 250, as described in greater detail below. The electrically powered light source 264 (e.g., a broad spectrum LED light source) may work in conjunction with known circuits (e.g., as found in commercial chromatic ranging systems) included in a probe power and signal control circuit portion 276 which is included in probe electronics 275, and which receives electrical power transmitted through the auto exchange joint element. In some embodiments, the probe electronics 275 includes a serializer 277S that allows various data signals to be serialized and communicated through the autojoint connection 230 using relatively few wires to a deserializer (included, for example, in the probe signal processing and control circuit 207), as described in greater detail below.

In the embodiment shown in FIG. 3A, the serializer 277S is included on the probe power and signal control circuit portion 276. However, in other embodiments, the serializer 277S may be included with the CRS wavelength detector 262, since much of the serialized data to be transmitted is measurement spectral profile data that originates in the CRS wavelength detector 262. More generally, the serializer 277S may be located at any desired location in the probe electronics 275 that provides satisfactory noise and crosstalk characteristics.

The light source 264 generates light originating in the CRS probe assembly, the light comprising an input spectral profile of wavelengths routed to the optical pen 220 through the fiber optic cable 212. The CRS wavelength detector 262 may comprise known circuits (e.g., as found in commercial chromatic ranging systems) that work in conjunction with a spectrometer arrangement 262' and detector array 263 comprising a plurality of pixels (e.g., more than 200 pixels, or even more than 1000 pixels, as disclosed in the incorporated '456 patent, for example) distributed along a measurement axis of the CRS wavelength detector, the plurality of pixels receiving respective wavelengths reflected into the confocal optical path from the target surface and providing output spectral profile data.

It will be appreciated that a configuration such as that outlined above which generates and processes the light used for measurement entirely within the CRS probe assembly allows the CRS probe assembly to be self-contained and automatically exchangeable. In various embodiments, such a CRS probe system does not require or include an optical fiber connection from the CRS probe assembly to an outside element through the autojoint connector, or along any other makeshift path in parallel with the autojoint connector. Stated another way, in various embodiments, such a CRS probe assembly does not connect to or include an optical fiber that extends outside of the CRS probe assembly.

In various embodiments, the CRS probe assembly is configured such that the optical pen is mounted at a distal end of the CRS probe assembly. In the embodiment shown in FIGS. 3A and 3B, the CRS probe assembly 215' includes the base portion 218, a wavelength detector mounting portion 219A coupled to the base portion 218, and an optical pen mounting portion 219B coupled to the base portion and carrying the optical pen without carrying the wavelength detector, which may isolate heat and mass-related deflection and vibration away from the optical pen. In some embodiments, one or both of the mounting portions 219A and 219B may comprise a hollow structural tube (e.g., a carbon fiber tube) that extends away from the base portion and toward the distal end of the CRS probe assembly.

In one embodiment, the center of mass of the optical pen 220 is located proximate to an axis defined by the center of mass CMPA of the rest of the CRS probe 215' and the center axis CAJ of the probe autojoint connection 230. Such a configuration may provide for smoother operation of the probe head 213 as it is utilized to move the CRS probe 215' (e.g., avoiding unnecessary additional torque, vibration, deflection, etc.). In one implementation, the optical pen 220 may also be mounted relative to the probe autojoint connection 230 such that the central axis CAOP (e.g., a reference axis for measurements) of the optical pen 220 is coaxial with the central axis CAJ of the auto exchange joint 230. In such a configuration, when the CMM rotates the probe autojoint connection 230 around its axis, the optical pen 220 may also be rotated around its axis with no lateral movement of the measurement reference axis in a X-Y plane. Such a configuration may provide certain advantages (e.g., being mechanically more stable, simplifying the calculation of the location of the measurements taken with the optical pen 220 relative to the positioning by the CMM, etc.).

Figure 4A:
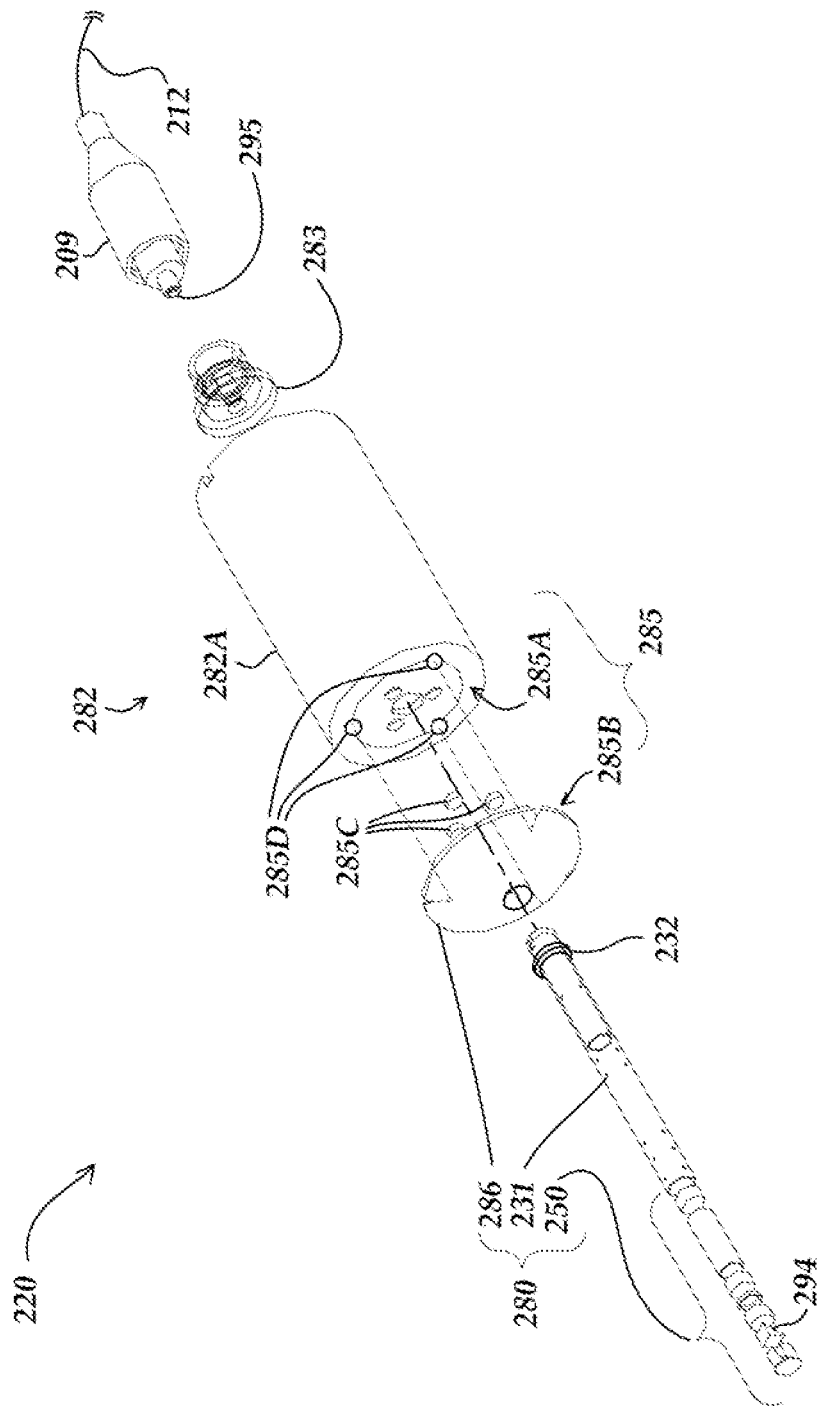
FIGS. 4A and 4B are diagrams illustrating the components of the optical pen including the repeatable fast exchange mount and the interchangeable optics elements of FIGS. 3A and 3B.
Figure 4B:
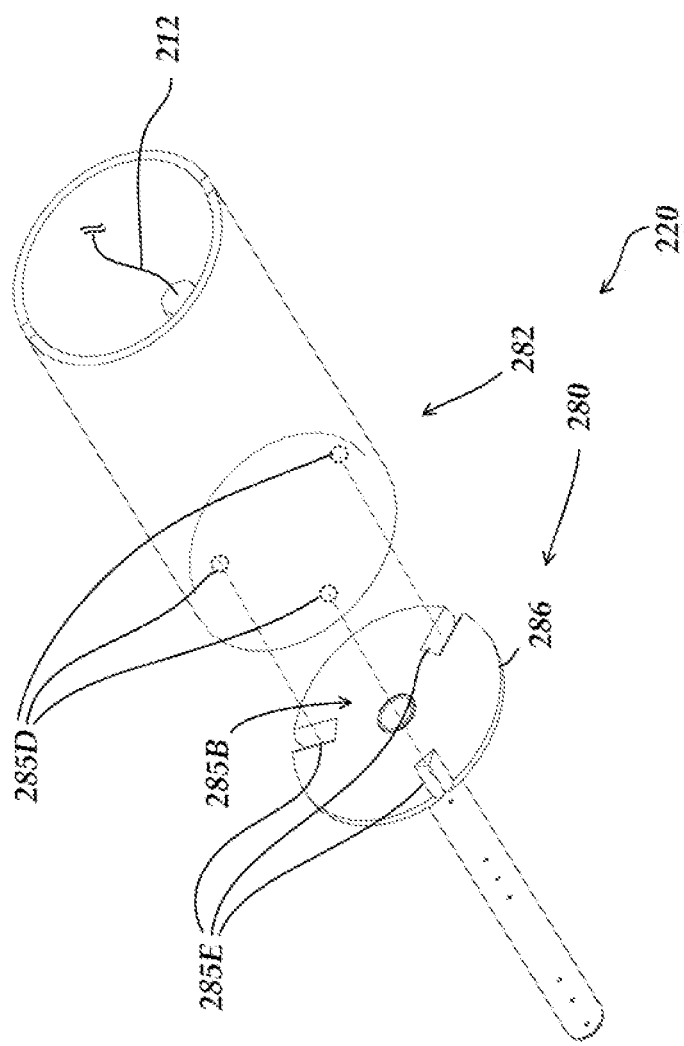

FIGS. 4A and 4B are diagrams illustrating components of the optical pen 220 of FIGS. 3A and 3B, for an embodiment that includes an exemplary repeatable fast exchange mount 285. In the embodiment shown in FIGS. 4A and 4B, the optical pen 220 includes a base member 282 and an interchangeable optics element 280. The interchangeable optics element 280 includes a front plate 286, tube 231, and chromatically dispersive optical portion 250. The base member 282 includes a base housing 282A which includes a surface which serves as a first mating half 285A of the repeatable fast exchange mount 285, and the front plate 286 has a corresponding surface which serves as a second mating half 285B of the repeatable fast exchange mount 285. In one embodiment, the second mating half 285B of the repeatable fast exchange mount 285 is magnetically forced against the first mating half 285A by permanent magnets 285C mounted in one or both of the first and second mating halves 285A or 285B. With such a configuration, the second mating half 285B may be automatically connected to and separated from the first mating half 285A under program control (e.g., as controlled by the computer and user interface 206). For example, in one embodiment the optical pen may include a collar 232 or the like, which may be guided under program control such that it is inserted between the arms of a mating fork included on a probe rack within the motion volume of a CMM. The CMM may then move the CRS probe 215' such that the arms of the fork bear on the collar 232 and force the mating halves of the repeatable fast exchange mount 285 apart, leaving the interchangeable optics element 280 hanging in the probe rack. The interchangeable optics element 280 may be mounted back to the base member 282 by the reverse of these operations. In addition, with such a configuration, in the event of a lateral collision with a workpiece, the interchangeable optics element 280 will separate from the base member 282, rather than being damaged.

In one embodiment, the repeatable fast exchange mount 285 may comprise three spheres or balls 285D which are fixed in the first mating half 285A in a first triangular pattern (e.g., an equilateral triangle), and a three radially oriented V-grooves 285E which are fixed in the second mating half 285B in a mating pattern. Such an embodiment of the repeatable fast exchange mount 285 allows the interchangeable optics element 280 to be mounted with the laterally oriented measurement beam 296 facing in any of three different orientations spaced 120 degrees apart. However, it will be appreciated that such an embodiment is exemplary only, and not limiting. Various other repeatable fast exchange mounting configurations may be used, provided that adequate mounting repeatability is provided, as is generally known in the art.

The interchangeable optics element 280 includes the chromatically dispersive optical portion 250 (e.g., analogous to the chromatically dispersive optical portion 150 described above with respect to FIG. 1). In one embodiment, the base member 282 includes the end of an optical fiber 212 that is connected to the LED light source 264 and to the spectrometer arrangement 262' through a fiber connector 261. The end of the optical fiber may be located proximate to a confocal aperture 295 that is fixed relative to the first mating half 285A of the repeatable fast exchange mount 285, which may generally surround the confocal aperture 295. In some embodiments, the end of the optical fiber provides the confocal aperture. In some embodiments, the confocal aperture 295 is provided by a thin aperture that is bonded in place proximate to or abutting the end of the optical fiber (e.g., on a holder or connector that holds the optical fiber). In the embodiment shown in FIG. 4A, the base member 282 includes an optical fiber locating element 283 (e.g., a fiber optic connector that mates with the connector 209, in this embodiment) that is fixed (e.g., bonded) in the base member 242 proximate to the first mating half 285A of the repeatable fast exchange mount 285. In this embodiment, the optical fiber locating element 283 fixes the end of the optical fiber and the confocal aperture 295 relative to the first mating half 285A of the repeatable fast exchange mount 285. However, in other embodiments, the confocal aperture may be separately fixed to the base member 282 and the end of the optical fiber may be fixed proximate to that confocal aperture by a suitable optical fiber locating element, if desired.

The interchangeable optics element 280 receives measurement light from, and returns measurement light to, the confocal aperture 295, and provides axial chromatic dispersion of the measurement light over a respective measuring range along a measuring axis. In one embodiment, the chromatically dispersive optical portion 250 may also include a reflective element 294, which directs the measurement beam laterally to the axis of the optical pen 220 (e.g., laterally relative to the axis of the tube 231).

FIG. 5 is a block diagram of one embodiment of the computer and user interface 206 and the probe signal processing and control circuit 207 of FIG. 2. As shown in FIG. 5, the probe signal processing and control circuit 207 may include a deserializer 5277D, a position latch 515, a CRS probe ID 520 and an optical pen ID 525. The components of the probe signal processing and control circuit 207 are coupled to one another and to the computer and user interface 206 by the data transfer line 201.

The deserializer 277D may work in conjunction with the serializer 277S shown in FIG. 3A, to allow various data signals to be serialized and communicated through the autojoint connection 230 using relatively few wires. The serializer 277S and a deserializer 277D are related to the utilization of certain low voltage differential signaling (LVDS) that may be used in some embodiments, as will be described in more detail below with respect to FIG. 7. Briefly, a synchronization signal is provided between a serializer and a deserializer, in order to ensure that they are synchronized. On the corresponding signal lines, clock signals are provided until the deserializer is finished, at which point the synchronization signal is switched, after which the relevant data signals are provided on the signal lines (i.e., as opposed to the previous clock signals).

The position latch 515 relates to an XYZ latch signal that will be described in more detail below with respect to FIG. 7. Briefly, an XYZ latch signal is provided for synchronizing the measurement positioning of the CRS probe with the measurement positioning of the coordinate measurement machine controller 202. In one embodiment, the position latch 515 communicates with the position latch 204 in the coordinate measurement machine controller 202 in order to ensure that the coordinates of the coordinate measurement machine 210 are properly synchronized. In other words, the position latch 515 and the position latch 204 combine to ensure the accuracy of the overall derived measurements, such that the CMM machine coordinates (which reflect the position of the CRS probe during a particular measurement) are properly combined with the CRS probe measurements (which are relative to the CRS probe position).

The CRS probe ID 520 is utilized for determining the identification of the CRS probe 215' (e.g., by reading and processing an identification signal derived from an identifying element included in the CRS probe 215'), and the optics elements ID 525 is utilized for determining the identification of the interchangeable optics element 280 (e.g., by reading and processing an identification signal derived from an identifying element included in the interchangeable optics element 280). The proper identification of the CRS probe 215' and the interchangeable optics element 280 allow proper configuration and calibration data to be utilized in order to ensure accurate operations and resulting measurements from the CRS probe 215' and interchangeable optics element 280.

Figure 6:
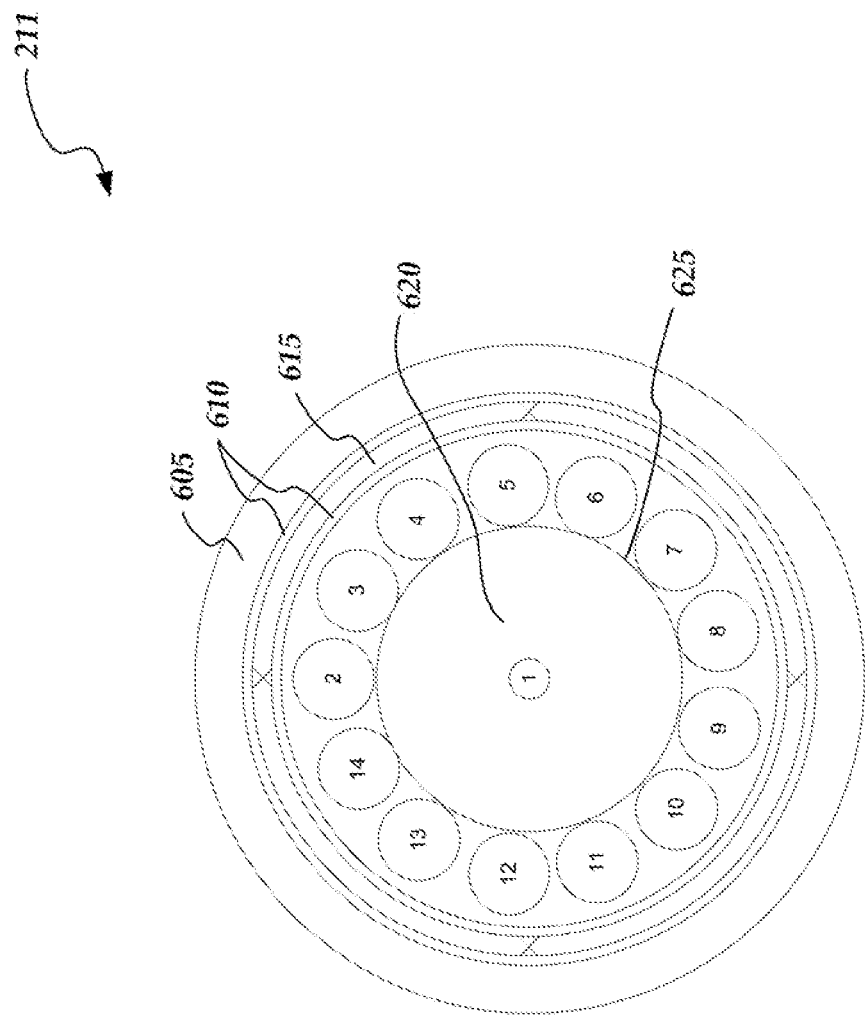
FIG. 6 a diagram illustrating a cross section of the probe data cable of FIG. 2.

FIG. 6 is a diagram illustrating a cross section of the probe data cable 211 of FIG. 2. As shown in FIG. 6, the probe data cable 211 includes a sheath 605, sealing tape layers 610, an electrical outer shield layer 615 and a coaxial cable 620 including a central conductor "1" and an inner shield layer 625. Additional conductors 2 through 14 are shown as surrounding the coaxial cable 620, in accordance with a conventional Renishaw™ configuration, as will be described in more detail below with respect to FIG. 7.

FIG. 7 is a table 700 outlining one exemplary connection and/or signal scheme usable with the probe data cable 211 of FIG. 6 and/or the autojoint connection 230 shown in FIGS. 3A and 3B. The connection numbers in the "Wire #" column indicate the wire number of the cable 211 that is connected to an auto joint pin (e.g., one standard Renishaw™ autojoint connection configuration), unless otherwise indicated.

As shown in the table 700, in this embodiment, power and signal ground connections, the low voltage differential signaling (LVDS) serializer signals SERDES+, SERDES− and SERDES block/sync, a CRS signal for the spectrometer/detector reset, and CRS control clock and data signals (e.g., I²C clock and data signals) may be provided on the various wires and connected auto joint pins. It will be appreciated that a plurality of wires may be used in combination to provide power to the CRS CMM probe, in order to meet certain standard autojoint and/or CMM controller design requirements (e.g., not providing more than 300 mA through any single conductor). For example, using two wires at 12 V, 300 mA each provides the capability of delivering 7.2 watts within standard autojoint and/or CMM controller specifications.

In general, the various signals may be routed on any suitable wire and/or autojoint pin. The serializer signals SERDES+, SERDES− are carried on lines/pins that connect the deserializer 277D and serializer 277S. Experiment and/or analysis may be used to select and/or verify the connections that provide reliable signal transmission. In various embodiments it may be particularly advantageous for the inner shield and outer shields to be connected to CRS ground, and the wire number COAX/1 used to carry the CRS detector signal(s) (i.e., the output spectral profile data or measurement signals, which may comprise spectrometer pixel value signal(s)) as indicated in the embodiment shown in FIG. 7. It will be appreciated that in a CRS system, it is relatively important that the spectrometer signals receive minimal distortion or additional noise. By utilizing the COAX portion (i.e., wire number 1) of the cable 211, minimal signal degradation results, thus providing a reliable means for transmitting the spectrometer signal.

With regard to the LVDS serializer signals SERDES+, SERDES−, they may be carried on two wires with a $3^{rd}$ wire carrying an associated ground, and the SERDES lock/sync signal may be carried on an additional wire. With regard to the serialization sequence, in one embodiment a position D0 is designated as being for the detector pixel clock. A position D1 is designated as being for the profile start signal for the spectral profile measurement data. A position D2 is designated as being for the spectrometer ready signal. The position D3 is designated as being for the XYZ latch signal (e.g., as described in more detail above with respect to the position latch 515 of FIG. 5). A position D4 is designated as being for a detector temperature alarm. The position D5 is designated as being for a spectrometer temperature alarm. The positions D6-D9 are not yet designated and thus are not specifically assigned in this embodiment.

With regard to the speed of the LVDS serialization, in one specific example implementation, the fastest available digital signal may be utilized (e.g., a detector pixel clock signal at several MHz). The serializer may then sample the digital signals at a relatively fast rate (e.g., two times the detector pixel clock rate). In one embodiment, the LVDS serializer may sample up to 10 digital signals per sample cycle. The serializer may then transmit the combined signals at a much faster rate (e.g., 2 times the detector pixel clock rate times <10 digital signals+2 synchronization bits>), which may provide a bit rate of more than 100 MHz, in some embodiments.

It will be appreciated that the above-described utilization of a low voltage differential signaling (LVDS) serializer is particularly advantageous where a limited number of connections are available in a standard autojoint connector. In other words, the standard autojoint connector only provides a limited number of connections (e.g., 13 pins). In contrast, a standard CRS system may utilize significantly more conductors, such as between the controller and the spectrometer (e.g., 24 conductors). The conductor count can be reduced in part by avoiding non-crucial signals. However, for the remaining signals, the LVDS serializer technique allows more signals to be provided to the controller board using only two signal lines, as described above with respect to FIG. 7.

Such LVDS serialization techniques may provide at least three or more distinct signals over two connections/conductors through the auto exchange joint element, and in some embodiments up to 10 digital signals or types of information using only two conductors through the auto exchange joint element. The signals are made to be robust, in that the differential signals ignore common mode noise. The technique may be implemented with low power (e.g., in one specific example embodiment the signals may be sent at +/−500 mV with a 1V offset), which is important in a CMM probe application. A high speed can be achieved (e.g., a range of 100 MHz to GHz operation). The signals may travel over relatively long wires (e.g., multiple meters of wire when proper termination is utilized). In one embodiment, the LVDS serialization techniques may be implemented using a SN65LV1023 serializer and SN67LV1224 deserializer from Texas Instrument of Dallas, Tex., USA. The signaling protocol outlined above, or other known LVDS signaling protocols, may be used.

Figure 8:
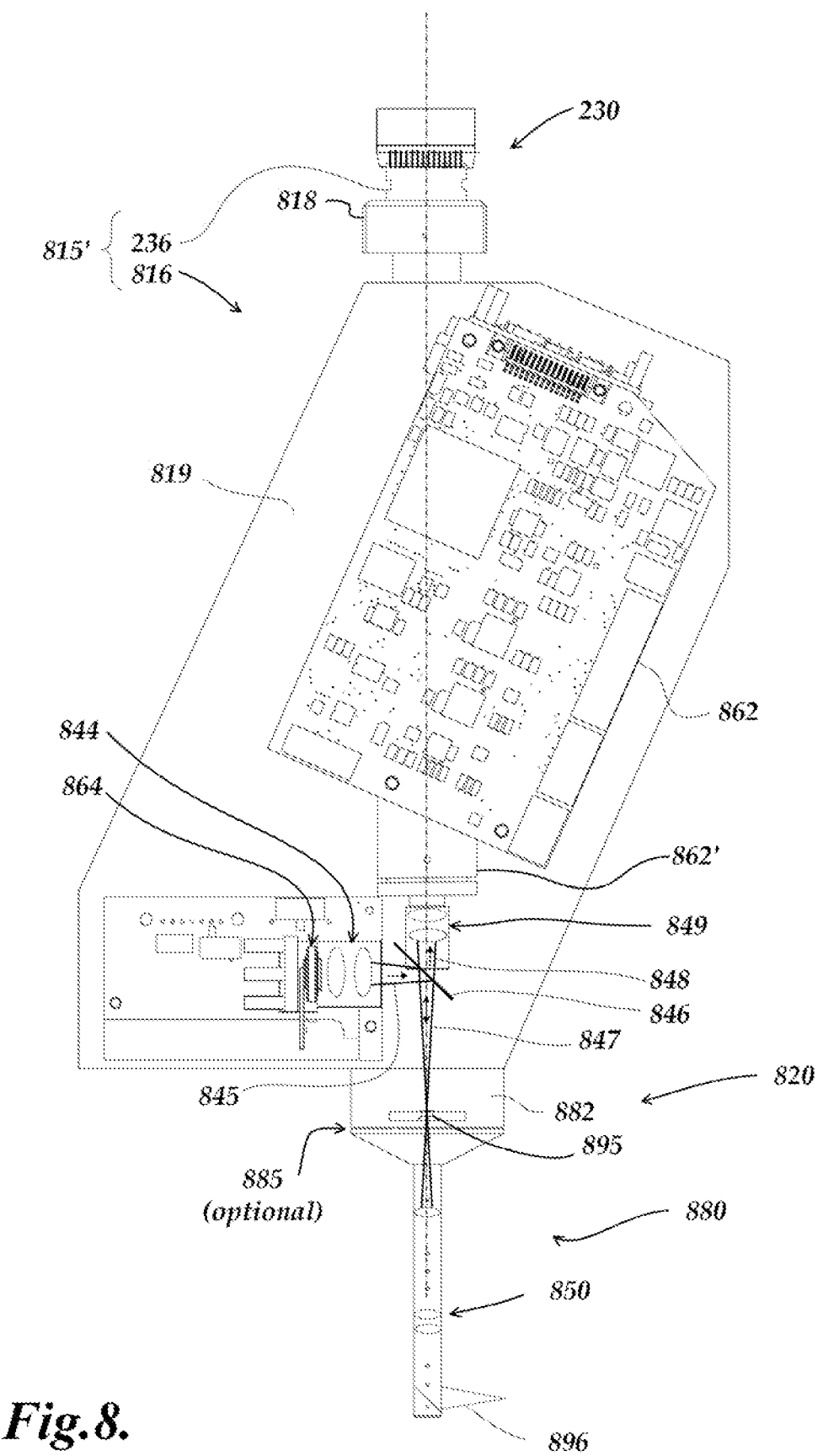
FIG. 8 is a diagram schematically illustrating optical paths usable in a second exemplary embodiment of the CRS probe of FIG. 2 in which the light used in the CRS probe assembly propagates through optical elements in free space rather than through a fiber.

FIG. 8 is a diagram schematically illustrating components and optical paths usable in a second exemplary embodiment of the CRS probe of FIG. 2 in which the light used in the CRS probe assembly propagates in free space through optical elements mounted in a fixed relationship, rather than through an optical fiber.

As shown in FIG. 8, the CRS probe 815' includes auto exchange joint element 236 and a probe assembly 816 that is mounted to the auto exchange joint element 236, for automatic connection to the CMM through the probe autojoint connection 230. The probe 815' may also include a protective cover or housing (not shown). The probe assembly 816 comprises an optical pen 820, an electrically powered light source 864, and a wavelength detector 862 supported by a frame 819 which may include various structural members, and which may extend from a base 818 that is attached to the auto exchange joint element 236. The frame 819 holds the various elements outlined above, as well as a set of optical path elements (e.g., lenses, a beamsplitter, etc.), in a fixed relationship that provides the desired optical path for the light used in the probe assembly 816. The optical pen 820 (analogous to the optical pen 220) may include a confocal optical path including an aperture 895 and chromatically dispersive optics portion 850, which outputs a measurement beam 896. In some embodiments, the optical pen 820 may include a repeatable fast exchange mount 885 which allows replacement of the chromatically dispersive optics portion 850, as outlined above in relation to the repeatable fast exchange mount 285.

In operation, the electrically powered light source 864 receives electrical power transmitted through the auto exchange joint element and generates light originating in the CRS probe assembly, the light comprising an input spectral profile of wavelengths. In the embodiment shown in FIG. 8, the input spectral profile is output through light source optics 844 which may provide a focused and/or shaped input beam 845. The input beam 845 is reflected at a beam splitter 846 along the beam path 847 to confocal aperture 895 of the optical pen 820. The optical pen transmits and outputs corresponding radiation to the workpiece surface in the measurement beam 896 and receives reflected radiation from the workpiece surface and outputs reflected radiation from the confocal aperture 895 back along the beam path 847 and through the beamsplitter 846 to provide an output spectral profile 848 to the spectrometer input optics 849 and to the spectrometer 862' of the CRS wavelength detector 862. The output spectral profile comprises a distance-dependent profile component having a wavelength peak that indicates a measurement distance from the optical pen to the workpiece surface, and the CRS wavelength detector provides corresponding output spectral profile data (e.g., output by electrical signals through the probe autojoint connection 230) according to previously outlined principles of operation for a CRS probe.

Similar to the previously described embodiments that include optical fiber light paths in the CRS probe assembly, it will be appreciated that a configuration such as that outlined above which generates and processes the light used for measurement entirely within the CRS probe assembly allows the CRS probe assembly 815' to be self-contained and automatically exchangeable. In various embodiments, such a CRS probe system does not require or include an optical fiber connection from the CRS probe assembly to an outside element through the auto joint connector, or along any other makeshift path in parallel with the auto joint connector. Stated another way, in various embodiments, such a CRS probe assembly does not connect to or include an optical fiber that extends outside of the CRS probe assembly.

In some embodiments, the center of mass of the optical pen 820 may be located proximate to an axis defined by the center of mass of the rest of the CRS probe 815' and the center axis of the probe autojoint connection 230. In one implementation, the optical pen 820 may also be mounted relative to the probe autojoint connection 230 such that the central axis of the optical pen 220 is coaxial with the central axis of the probe autojoint connection 230. In some embodiments, the optical pen 820 may include a repeatable fast exchange mount 885, which may be designed according to previously outlined principles, for example including a base member 882 and an interchangeable optics element 880.

Figure 9:
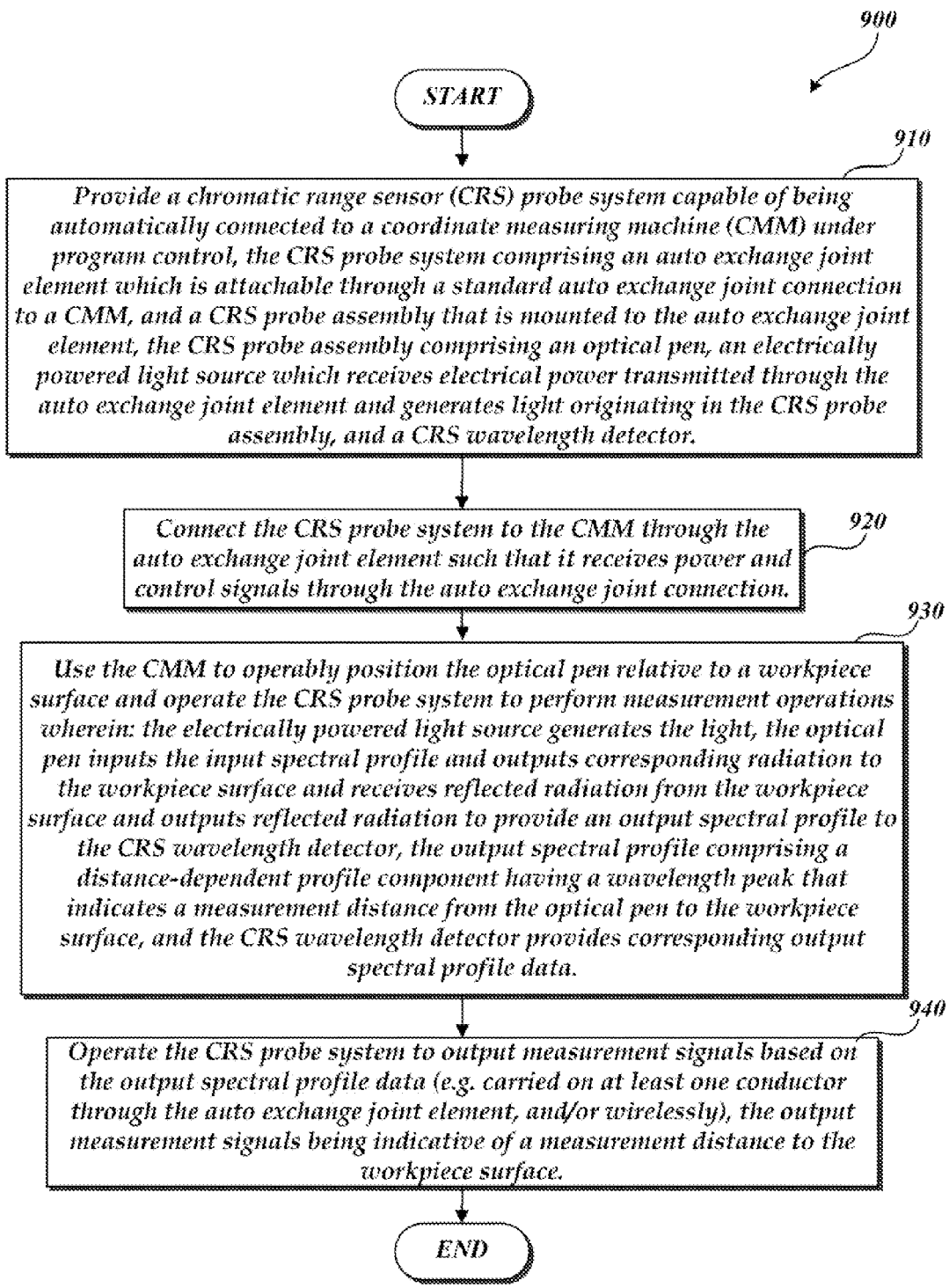
FIG. 9 is a flow diagram illustrating one exemplary embodiment of a routine for providing and operating an automatically interchangeable CRS probe system on a CMM.

FIG. 9 is a flow diagram illustrating one exemplary embodiment of a routine 900 for providing and operating an automatically interchangeable CRS probe system embodiment as disclosed herein. At a block 910, a CRS probe system is provided that is capable of being automatically connected to a CMM under program control. The CRS probe system includes an auto exchange joint element which is attachable through a standard auto exchange joint connection to a CMM, and a CRS probe assembly that is mounted to the auto exchange joint element for automatic connection to the CMM through the auto exchange joint element. In various embodiments, such a CRS probe system does not require or include an optical fiber connection from the CRS probe assembly to an outside element through the auto joint connector, or along any other makeshift path in parallel with the auto joint connector. The CRS probe assembly includes an optical pen, an electrically powered light source which receives electrical power transmitted through the auto exchange joint element and generates light originating in the CRS probe assembly, and a CRS wavelength detector. As outlined previously, in various embodiments the optical pen comprises a confocal optical path including a chromatically dispersive optics portion, the optical pen configured to focus different wavelengths at different distances along a measurement axis proximate to a workpiece surface to be measured. The light originating in the CRS probe assembly comprises an input spectral profile of wavelengths routed to the optical pen. The CRS wavelength detector comprises a plurality of pixels distributed along a measurement axis of the CRS wavelength detector, the plurality of pixels receiving respective wavelengths and providing output spectral profile data.

At a block 920, the CRS probe system is connected to a CMM through the auto exchange joint element and power and control signals are provided to the CRS probe assembly through the auto exchange joint connection.

At a block 930, using the CMM, the optical pen is operably positioned relative to a workpiece surface, and the CRS probe system is operated to perform measurement operations wherein: the electrically powered light source generates the light, the optical pen inputs the input spectral profile and outputs corresponding radiation to the workpiece surface and receives reflected radiation from the workpiece surface and outputs reflected radiation to provide an output spectral profile to the CRS wavelength detector. The output spectral profile comprises a distance-dependent profile component having a wavelength peak that indicates a measurement distance from the optical pen to the workpiece surface. The CRS wavelength detector provides corresponding output spectral profile data as part of the measurement operations. At a block 940, the CRS probe assembly is operated to output measurement signals based on the output spectral profile data, wherein the output measurement signals are indicative of a measurement distance to the workpiece surface. In some embodiments, the output spectral profile data as provided by the pixel values of a detector array included in the wavelength detector are the output measurement signals. However, in other embodiments, the output measurement signals may be signals derived from the measured spectral profile data (e.g., compensated signals, or a determined wavelength peak value, or a final distance measurement derived therefrom, or the like). In various embodiments, the output measurement signals are carried on at least one conductor through the auto exchange joint element. In some embodiments, some or all of the signals may be wirelessly transmitted, and bypass the probe autojoint connection. It will be appreciated that the feature of the CRS probe configurations disclosed herein that allows them to be self-contained and automatically exchangeable is that they are configured to generate and process the light used for measurement entirely within the CRS probe assembly.

While the preferred embodiment of the invention has been illustrated and described, numerous variations in the illustrated and described arrangements of features and sequences of operations will be apparent to one skilled in the art based on this disclosure. For example, although the embodiments described above have emphasized control and data signals that are output in the form of signals conducted through the probe autojoint connection 230, some or all of the signals could be wirelessly transmitted, and bypass the probe autojoint connection 230. It will be appreciated that the feature of the CRS probe configurations disclosed herein that allows them to be self-contained and automatically exchangeable is that they are configured to generate and process the light used for measurement entirely within the CRS probe assembly. After the light is processed to determine the output spectral profile data, it may be wirelessly transmitted to avoid extraneous optical fiber connections outside of the CRS probe assembly, if desired. Thus, it will be appreciated that various changes can be made therein without departing from the spirit and scope of the invention.

The invention claimed is:

1. A chromatic range sensor (CRS) probe system capable of being automatically connected to a coordinate measuring machine (CMM) under program control, the CRS probe system comprising:
   an auto exchange joint element that is attachable through a standard auto exchange joint connection to a CMM; and
   a CRS probe assembly that is mounted to the auto exchange joint element, for automatic connection to the CMM through the auto exchange joint element, wherein:

the CRS probe assembly comprises:
- an optical pen comprising a confocal optical path including a chromatically dispersive optics portion, the optical pen configured to focus different wavelengths at different distances along a measurement axis proximate to a workpiece surface to be measured;
- an electrically powered light source which receives electrical power transmitted through the auto exchange joint element and generates light originating in the CRS probe assembly, the light comprising an input spectral profile of wavelengths routed to the optical pen; and
- a CRS wavelength detector comprising a spectrometer or spectrograph arrangement, wherein a dispersive optics portion transmits a spectral intensity profile to a detector array comprising a plurality of pixels distributed along a measurement axis of the CRS wavelength detector, the plurality of pixels receiving respective wavelengths and providing output spectral profile data;

the CRS probe assembly is configured to receive power and control signals through the auto exchange joint connection;

the CRS probe assembly is configured such that when the auto exchange joint element is attached to the CMM and the optical pen is operably positioned relative to the workpiece surface to perform measurement operations and the electrically powered light source generates the light, the optical pen inputs the input spectral profile, outputs corresponding radiation to the workpiece surface, receives reflected radiation from the workpiece surface, and outputs reflected radiation from the confocal optical path to provide an output spectral profile to the CRS wavelength detector, the output spectral profile comprising a distance-dependent profile component having a wavelength peak that indicates a measurement distance from the optical pen to the workpiece surface, and the CRS wavelength detector providing corresponding output spectral profile data; and the CRS probe assembly is configured to output measurement signals based on the output spectral profile data, the output measurement signals being indicative of the measurement distance to the workpiece surface.

2. The system of claim 1, wherein the output measurement signals comprise the output spectral profile data from the plurality of pixels of the detector array.

3. The system of claim 2, wherein the output measurement signals are carried on at least one conductor through the auto exchange joint element and received through the auto exchange joint element by a probe signal processing and control circuit that determines measurement distances based on the output spectral profile data.

4. The system of claim 3, wherein the output measurement signals are transmitted through a shielded coaxial cable included in the auto exchange joint connection.

5. The system of claim 2, wherein the CRS probe assembly further comprises a memory portion that includes at least one of calibration data or compensation data for the CRS probe assembly.

6. The system of claim 2, wherein at least one of calibration data or compensation data for the CRS probe assembly is stored in at least one of the CMM and a probe signal processing and control circuit that receives signals from the CRS probe assembly.

7. The system of claim 1, wherein the optical pen comprises an interchangeable optics element that includes the chromatically dispersive optics portion, and the optical pen further comprises an optical pen base member that receives the interchangeable optics element and holds it in a fixed relationship relative to the base member.

8. The system of claim 7, wherein the optical pen base member comprises:
- a housing including a first mating half of a repeatable fast exchange mount, and the end of an optical fiber that is connected to the light source and the wavelength detector, wherein the optical fiber is terminated proximate to a confocal aperture that is fixed relative to the first mating half of the repeatable fast exchange mount.

9. The system of claim 8, wherein the interchangeable optics element comprises:
- a second mating half of the repeatable fast exchange mount; and
- an optical assembly that is fixed relative to the second mating half of the repeatable fast exchange mount comprising the chromatically dispersive optics portion, the optical assembly receiving measurement light from and returning measurement light to the confocal aperture, and providing axial chromatic dispersion of the measurement light over a respective measuring range along a measuring axis.

10. The system of claim 1, wherein the CRS probe assembly comprises:
- a base portion mounted to the auto exchange joint element;
- a wavelength detector mounting portion coupled to the base portion; and
- an optical pen mounting portion coupled to the base portion and carrying the optical pen without carrying the wavelength detector.

11. The system of claim 10, wherein:
the auto exchange joint element has a central axis (CAJ), the wavelength detector mounting portion and the optical pen mounting portion are each coupled to the base portion at an off-axis position relative to the auto exchange joint element central axis (CAJ), and the optical pen mounting portion is configured to carry the optical pen such that a central axis (CAOP) of the optical pen is located to be approximately coaxial with the central axis (CAJ) of the auto exchange joint connection.

12. The system of claim 11, wherein the CRS probe assembly is configured such that the optical pen is mounted at a distal end of the CRS probe assembly.

13. The system of claim 10, wherein the optical pen mounting portion comprises a hollow structural tube that extends away from the base portion and toward a distal end of the CRS probe assembly.

14. The system of claim 1, wherein an XYZ latch signal is provided for synchronizing the measurement positioning of the CRS probe system with the measurement positioning of the CMM.

15. The system of claim 1, wherein the detector array comprises more than 200 pixels.

16. The system of claim 1, wherein:
the CRS probe assembly is configured such that the optical pen is mounted at a distal end of the CRS probe assembly and a central axis (CAOP) of the optical pen is located approximately coaxial with a central axis (CAJ) of the auto exchange joint connection; and
the optical pen is configured to output radiation to the workpiece surface, and receive reflected radiation from the workpiece surface, along a direction transverse to the central axis (CAOP) of the optical pen.

17. The system of claim 1, wherein the system is configured to provide serialization for signals of the CRS probe assembly wherein the serialization is utilized for providing three or more distinct signals over two connections through the auto exchange joint element.

18. The system of claim 17, wherein the system is configured to provide the serialized signals as differential signals over the two connections through the auto exchange joint element.

19. The system of claim 18, wherein the system comprises a low voltage differential signaling (LVDS) serializer that is used to provide the serialized differential signals.

20. The system of claim 1, wherein the detector array comprises at least 1000 pixels.

* * * * *